(No Model.) 2 Sheets—Sheet 1.
C. VOSE.
PROCESS OF EXTRACTING PARAFFINE FROM PETROLEUM DISTILLATE.
No. 346,448. Patented July 27, 1886.
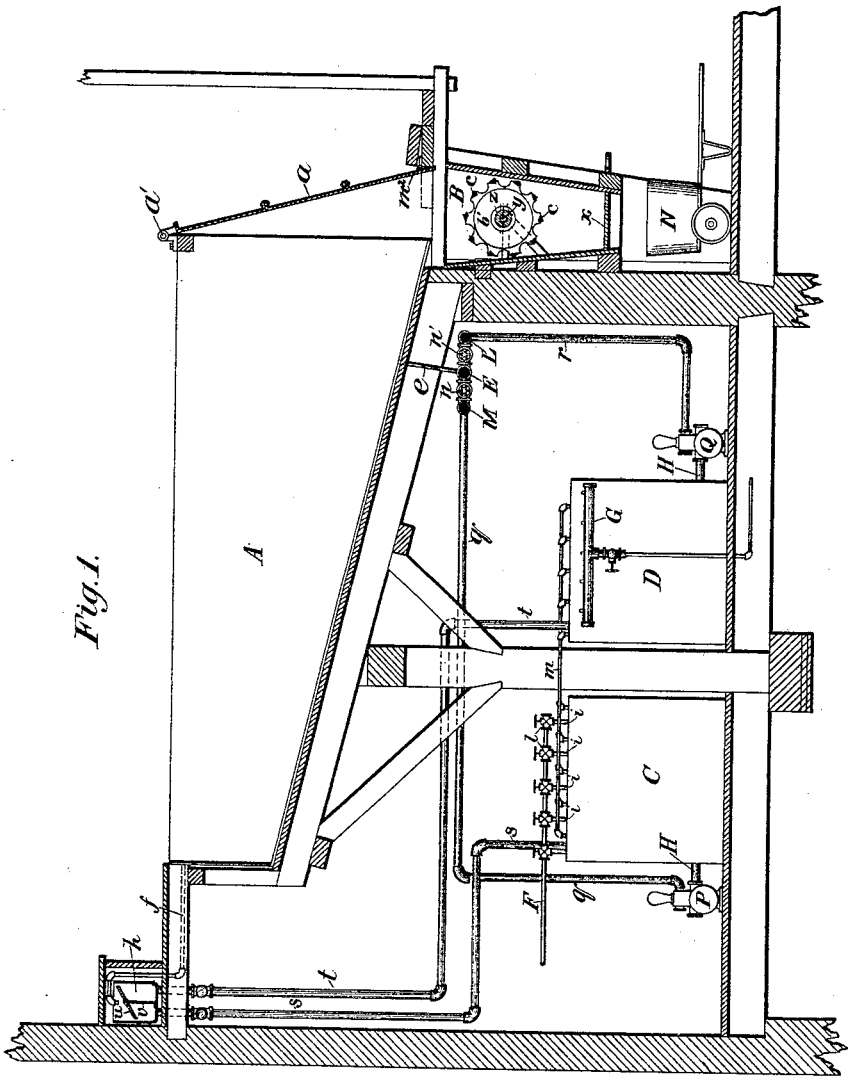

(No Model.) 2 Sheets—Sheet 2.
C. VOSE.
PROCESS OF EXTRACTING PARAFFINE FROM PETROLEUM DISTILLATE.
No. 346,448. Patented July 27, 1886.
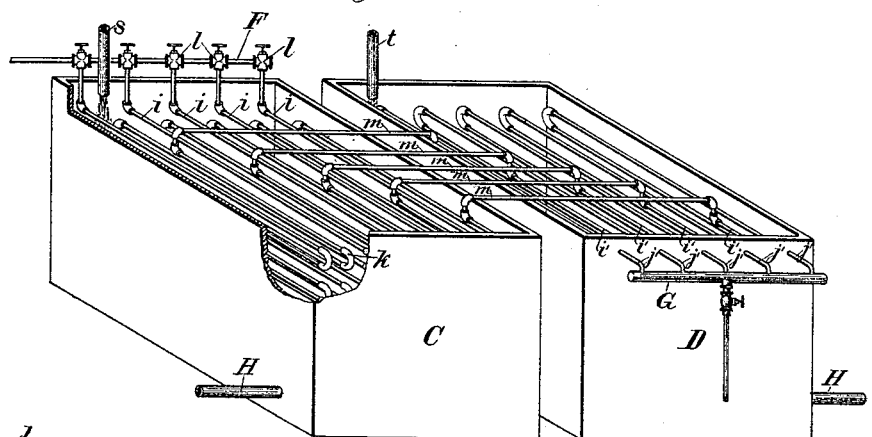
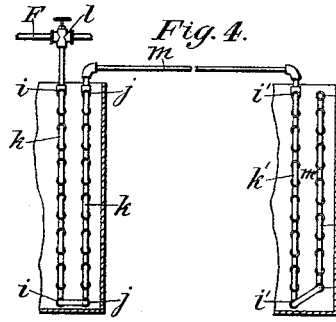
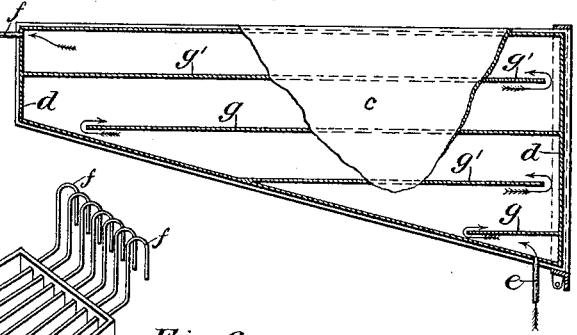
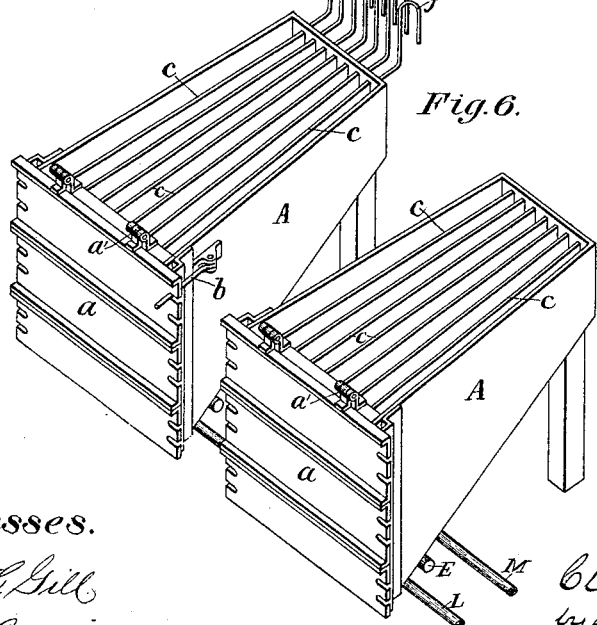
Witnesses.
Harry L. Gill
W. F. Corwin
Inventor:
Clarence Vose
by his attorneys
Bakewell & Kerr

UNITED STATES PATENT OFFICE.

CLARENCE VOSE, OF BROOKLYN, ASSIGNOR TO THE PRATT MANUFACTURING COMPANY, OF NEW YORK, N. Y.

PROCESS OF EXTRACTING PARAFFINE FROM PETROLEUM DISTILLATE.

SPECIFICATION forming part of Letters Patent No. 346,448, dated July 27, 1886.

Application filed February 12, 1886. Serial No. 191,685. (No model.)

*To all whom it may concern:*

Be it known that I, CLARENCE VOSE, of Brooklyn, in the county of Kings and State of New York, have invented a new and useful Improvement in Processes for Extracting Paraffine from Petroleum Distillate; and I do hereby declare the following to be a full, clear, and exact description thereof.

Paraffine, which exists in petroleum in an amorphous condition, becomes by the process of distillation capable of being separated from the lighter and liquid hydrocarbons of the distillate by a process which consists, substantially, in subjecting the distillate to a sufficient degree of refrigeration to harden the entire mass, which is then subjected to pressure, which causes the petroleum which had been associated with the paraffine to run off in a liquid form, leaving the solid particles of paraffine in a separate mass or cake. The paraffine thus obtained requires, however, further treatment to produce the paraffine of commerce.

My present invention consists in certain improvements in the various steps of the process, and in the combination of these improved steps in a continuous process of extracting paraffine from petroleum distillate.

In describing my improved process I shall of necessity describe also the apparatus which I employ for the purpose, which apparatus, however, is not claimed in this patent, as a portion of it has already been patented to Henry H. Rogers and myself by Letters Patent of the United States No. 316,400, dated April 21, 1885, and other portions from the subject-matter of two separate applications for Letters Patent filed herewith.

The hot paraffine distillate, containing, usually, about eighteen per cent. of paraffine as it comes from the stills, is run into a freezing-box, in which it is gradually cooled by means of a refrigerating-liquid until the whole mass is frozen into a solid cake. The gradual cooling of the distillate is important, as the crystallization of the paraffine would be impaired if the distillate were exposed at first to a too great degree of cold. In order to secure this gradual refrigeration, I first employ fresh water at about 52° Fahrenheit, then saline water or brine cooled to from 45° to 10° Fahrenheit, and, lastly, brine cooled from 20° Fahrenheit to 10° below zero, until the distillate is rendered quite hard and solid. If desired, the use of the fresh water at the beginning of the process may be dispensed with, and refrigerated brine may be used exclusively. As the cooling of the distillate requires a considerable length of time, I use a series of cooling-boxes, which are filled with hot distillate at intervals of time, depending on the number of freezing-boxes in the series, so that the contents of each will become frozen and ready for the subsequent step of subjecting the frozen distillate to pressure at suitable intervals to enable the entire process to be carried on continuously, and so that the contents of each box may be removed as soon as it is sufficiently frozen. The freezing-boxes which I employ are specially adapted for the easy and speedy removal of the frozen cakes of distillate, as well as for the prompt action of the refrigerating-liquid upon the distillate, so that the rapidity with which the freezing operation is conducted may be regulated by the temperature of the freezing medium.

In the drawings accompanying and forming part of this specification, Figure 1 is a side elevation, partly in section, of the apparatus for cooling the brines, freezing the paraffine distillate, and cutting up the frozen distillate. Fig. 2 is a plan view of part of the main pipes and supply-pipe which connect the brine-tanks with the circulating-pumps and freezing-boxes. Fig. 3 is a perspective representation of a pair of brine-tanks, showing the arrangement of coils for cooling the brine. Fig. 4 is a vertical section showing the arrangement and connection of coils in a pair of brine-tanks. Fig. 5 is a longitudinal vertical section of one of the partitions in the boxes for chilling the paraffine distillate. Fig. 6 is a perspective representation of a pair of cooling-boxes.

These several figures are not made to a uniform scale, some being enlarged to exhibit the construction more clearly; but the same letters in all the figures are used to designate the same parts of the apparatus.

In the accompanying drawings, Fig. 1, A represents one of these freezing-boxes, the others of the series being similarly constructed and placed side by side, preferably with sufficient space between them to enable them to be approached on both sides, if necessary. They are in an elevated position above the floor of the factory, for convenience in removing their frozen contents, as hereinafter described. These boxes are preferably constructed of wrought-iron. The top of each box is horizontal and the bottom inclined downward from the rear end to the front. The front and rear ends may be parallel; but the sides are not so, and the box is narrower at the rear than at the front end, the purpose of the inclined bottom and tapering sides being to facilitate the discharge of the frozen distillate. The box may be covered at the top when in use by a floor of loose boards, so as to be gradually removed or shifted when the frozen contents are being discharged, affording standing-room for the workmen. The front end of the box constitutes the door $a$, which is hinged to the frame of the box at the top, as shown at $a'$ in Fig. 1, so that when opened it may serve as a guide for the lumps of frozen distillate as they pass into the cutting-boxes B, placed below and in front of the freezing-boxes, as shown in Fig. 1. When the boxes are to be filled with hot distillate and during the freezing operation, the door is secured in place against the front end of the box by bolts $b$, and any suitable packing may be used to prevent the escape of the distillate while hot and in a liquid condition. Inside of the box are a number of vertical partitions, $c$, placed, preferably, at uniform distances apart, and dividing the box into a series of compartments, which are narrower at the rear than at the front end of the box. These partitions are attached to the rear end and bottom of the box, and at the front end are flush with the inside of the door $a$ when closed; but spaces may be left at the bottom of each partition, so that the liquid contents may, in filling the boxes, pass from one compartment to another. These partitions $c$ are hollow, being constructed of two side pieces of sheet metal riveted to a skeleton frame, $d$, which constitutes the top, bottom, and end pieces of each partition. A pipe, $e$, is introduced through or screwed into a hole bored through the bottom of each skeleton frame $d$, and another pipe, $f$, is introduced through or screwed into a hole through the top of each skeleton frame, the pipes $e$ at bottom being the inflow branch pipes from the main pipe E, which conducts the refrigerating-liquid into the partitions $c$, and the pipes $f$ at top being outflow-pipes for the escape of the liquid from each partition $c$.

In order to secure a more perfect circulation of the refrigerating-liquid through the partitions, each is furnished with longitudinal strips of iron $g$, attached to or forming part of the skeleton frame. These strips $g\ g'$ are of the width of the skeleton frame $d$, and consequently of the same width as the cavity of the partition. Each alternate strip $g$ extends from the front end of the hollow partition $c$, near to but not touching the rear end, while the other strips, $g'$, are attached to the rear end or bottom of the partition and extend toward but do not reach the front end of the partition $c$, (see Fig. 5,) thus forming a circuitous passage in each partition for the brine or other refrigerating-liquid from the bottom to the top, causing it as it enters the bottom of the partition to flow backward and forward, gradually rising until it reaches the outflow-pipe $f$, whence it runs into a horizontal trough, $h$, from which the brine flows back to the tank from which it came, as hereinafter described.

I will now describe the tanks for refrigerating the brine used for freezing the paraffine distillate in the freezing-boxes just described. For this purpose two or more brine-refrigerating tanks are used in connection with each distillate-freezing box; but if the brine-tanks are of sufficient capacity it is not necessary to have a separate pair of brine tanks for each freezing-box, the number of tanks used with a series of freezing-boxes being a matter of detail which may be regulated at pleasure; but by having several brine-tanks, brine may be obtained of various degrees of temperature, if this is desired. The object of connecting each distillate-freezing box with two brine-tanks is, that the condensed ammonia-gas or other medium used for refrigerating the brine may be first used in one tank and then passed into the second tank, the result of which will be that the brine in the first tank will be much colder than that in the second tank, and the warmer brine in the second tank may be first used in the distillate-freezing boxes until the distillate is partially cooled, and then the colder brine from the first tank may be used to complete the freezing operation. By this means a great saving is effected, as the condensed ammonia-gas when it has been partially expanded in the first tank is still sufficiently unexpanded to be utilized in producing a lesser degree of refrigeration of brine in another tank, the warmer brine being sufficiently cold for the first stage of the operation of freezing the distillate.

In the drawings, Figs. 1 and 3, C and D are a pair of brine-tanks, one of which, C, I call, for convenience, the "cold" tank, and the other, D, the "warm" tank; but it must be noticed that the word "warm," as thus used, is merely a relative term to distinguish the second tank from the first. These tanks are constructed of iron, wood, or other suitable material, and shape, the shape and size which I have found convenient for the purpose being a rectangular box of about sixteen feet in length, six feet in height, and five feet in width. The first or cold tank, C, is furnished with a series of vertical rows of pipe, $i\ j$, placed substantially horizontally, each pipe in each vertical row being connected with the pipe immediately below it by a return-bend, $k$, and the lowest pipe $i$ of each alternate vertical row being similarly connected with the lowest pipe $j$ of the adjacent row, so that every pair of vertical rows of pipe forms a separate pair of coil, the several coils in the first or cold tank not being connected together. The uppermost horizontal pipe in the first vertical row $i$ of each coil is connected by an elbow with a horizontal main or feed pipe, F, furnished with a valve or stop-cock, $l$, through which main the condensed ammonia-gas is introduced into the apparatus, and the uppermost horizontal pipe $j$ in the second vertical row of each coil is connected with a horizontal transverse pipe, $m$, which extends across the top of the cold-tank C to the second or warm-tank, D, where it connects with the topmost horizontal pipe, $i'$, of the first row of the corresponding coil in the warm-tank. The warm-tank is furnished with coils of pipe, each coil consisting of two vertical rows $i'$ and $j'$, arranged and connected as in the cold-tank; but the front end of the topmost pipe in the second row, $j'$, of each coil in the warm-tank D is extended out through the end of the tank and connects with a horizontal main, G, through which the spent ammonia-gas passes back to a pump or any suitable gas condensing apparatus, to be prepared by recondensation for repeated use.

Each of the brine-tanks C and D is furnished with an outflow-pipe, H, through which the refrigerated brine passes to a force-pump, P Q, by which it is forced into a horizontal main pipe placed under the freezing-boxes A, Figs. 1 and 2, from which it is admitted by a valve into the bottom of the hollow partitions of the freezing-boxes A, and, circulating through the partitions, passes out at the outflow-pipe $f$, and is returned through a pipe into the brine tank C or D, from which it came, to be again refrigerated for repeated use. There are two such mains under the freezing-boxes, one supplying brine from the warm-tank and the other from the cold-tank, as will be hereinafter more fully explained. The operation of these brine-tanks is as follows: The tanks C and D being filled with brine to be refrigerated, the condensed ammonia-gas (or other condensed refrigerating medium) is introduced into the top pipe of the first half $i$ of each coil in tank C, separately from the main pipe F, by means of a valve, $l$, or into so many of the coils as it may be found advisable to use, depending upon the degree of temperature to which it is desired to lower the brine in the cold-tank. If a very low temperature is desired, all the coils are used; but if a less degree of cold is required, one or more of the coils may be kept closed to the access of the gas. The condensed ammonia-gas, being forced through the main F into the coils $i$ of the first tank, C, passes downward through the first half of each coil, and then up through the second half $j$ of the same coil, expanding as it passes, and emerges from the first tank through the horizontal pipe $m$, and enters at the top of the first half of the corresponding coil, $i'$, in the second tank, D, and thence downward through the first half, $i'$, and upward through the second half, $j'$, of each coil, and finally passes from the second tank in a spent or expanded condition to the outlet main pipe G, through which it is drawn by a pump or other device to the condensing apparatus, to be again condensed for repeated use.

It is evident that the brine in the first or cold tank, C, which surrounds the coils of pipe therein, will be reduced to a much lower temperature than the brine in the second or warm tank, D, because the ammonia-gas, when it reaches the coils in the second tank, is already partially expanded or spent, and it is only by its further expansion that it can produce a refrigerating effect on the brine in that tank. In the practice of my process I cool the brine in the cold-tank C from 20° Fahrenheit to as low as 10° Fahrenheit, and in the second or warm tank, D, from 10° to 45° Fahrenheit; but this may be regulated, as before described, by the bringing into use of a smaller or greater number of coils.

The arrangement of the pipe in the brine-tanks in vertical coils, as I have described, is very advantageous in the cooling of brine by means of condensed ammonia-gas. When the condensed gas enters the top pipe of each coil, if the surrounding brine in the tank is comparatively warm, the ammonia rapidly absorbs caloric, expands freely, and readily passes down one half of the coil and up through the pipes of the other half to the point of exit; but as the environment of the coils of pipes becomes colder, the expansion of the condensed ammonia-gas becomes sluggish, and the caloric is less rapidly absorbed from the brine. Under these circumstances, when the condensed gas reaches the bottom of one half of the coil, it cannot pass upward through the other half otherwise than in an expanded or gaseous condition, so that it will not traverse the second half of the coil until it is more or less expanded, as it might do if the exit from each coil were at the lower end or bottom of the coil, even when drawn through by an exhaust-pump; hence the advantage of arranging the gas-expansion tubes in coils one half of which descend and the other half ascend, and making the exit and entrance of the condensed gas at the top of both coils, so that the condensed gas, which has only partially expanded in the descending half of the coil, is forced to expand into a gaseous condition, in order to rise through the ascending portion of the coil to its point of exit. A similar advantage results from the use of two tanks, the second one of which is cooled by the partially-spent gas from the first, because brine in the first tank becomes so cold that the gas will not freely expand, and would be returned to the condensing-engine in a half-spent condition were it not that the brine in the second tank, being much warmer, furnishes the caloric necessary for the further expansion of the gas, and thus secures a more perfect utilization of the condensed ammonia-gas.

The continuous circulation of the brine cooled in the brine-tanks, as just described, and thereby the continuity of the operation, requires that the brine from the warm-tank D should first be circulated through one or more of the tanks newly filled with the hot distillate, and that after a distillate has been partially cooled, the colder brine from the cold-tank C should be substituted, the flow of brine from the warm-tank D being then turned into another distillate-box. This is readily effected and the complete control of the operation is secured by means of an arrangement of apparatus, pipes, and valves, which I will proceed to describe.

As shown in the drawings, the distillate-boxes A are placed on a higher level than the brine-tanks, which may be conveniently placed beneath the distillate-boxes. Fig. 1 shows a side view of my apparatus partly in section, and therefore only shows one distillate-box; but, as before stated, a number of them may be placed in a row side by side, or otherwise arranged in convenient proximity. A short transverse brine-supply pipe, E, is arranged horizontally under the front end of each distillate-box A, extending only the width of the box; but each such supply-pipe is connected with both the cold-tank C and the warm-tank D by means of two horizontal mains, L and M. Small branch pipes $e$ from the supply-pipe E enter the bottom of the cavity of the partitions $c$ in the freezing-boxes, as before described. The mains M and L run horizontally under the series of freezing-boxes parallel with the supply-pipes E, and each supply-pipe E is separately connected by a stop-cock or valve, $n$, with the cold-main M, and by a stop-cock or valve, $n'$, with the warm-main L. The cold-main M is connected by a pipe, $q$, with the pump P, which draws the cold brine through the pipe H from the cold-tank C, while the warm-main L is similarly connected by a pipe, $r$, with the pump Q, which draws the warmer brine from the tank D.

By the arrangement of pipes and valves just described, a circulation of either cold or warm brine may be established through any number of the freezing-boxes A by closing the valve $n'$ and opening the valve $n$, or vice versa. The brine from either of the tanks C or D, entering the partitions of the freezing-boxes A through the pipes $e$, traverses the partitions and passes out at the top through an outflow-pipe, $f$, (see Figs. 1 and 5,) and flows into a transverse trough, $h$, from which return-pipes $s$ and $t$ pass downward to the tanks C and D, respectively, the pipe $s$ returning to the cold-tank the brine which came from it, and the pipe $t$ returning to the warm-tank the brine which came from it. The trough $h$ is divided by partitions; or there may be a separate trough for each brine-tank, so as to prevent the commingling of the cold brine from one freezing-box with the warmer brine from another. In each trough $h$ is a hinged diaphragm, $u$, which may be inclined in either direction, and a partition, $v$, extending longitudinally through the trough and vertically from the hinged center of the diaphragm $u$ to the bottom of the trough, divides it into two water-ways, with one of which the pipe $s$ to the cold-tank C is connected, and with the other the pipe $t$ to the warm-tank D. Now, if the diaphragm $u$ is inclined in the direction shown in Fig. 1, the brine overflowing from the freezing-box A through the pipe $f$ is conducted by the diaphragm $u$ into the return-pipe $s$, connecting with the cold-tank C; but if the inclination of the diaphragm is reversed the brine is returned through the pipe $t$ to the warm-tank D. The diaphragm is readily shifted into either position by means of a rod or rope.

By using a series of distillate-freezing boxes and brine-refrigerating tanks and filling them with hot distillate successively, when the contents of each preceding tank in the series has been partially cooled by means of the partially-cooled brine from the warm-tank, and following the use of the warm brine in each freezing-box with the use of the cold brine from the cold-tank, the process may be continued without intermission, effecting a great saving of time, as the several freezing-boxes will be ready to be discharged in succession, and the operation of employing one tank will be attended to while the process of freezing is going on in other freezing-boxes of the series.

After the first freezing of the distillate has been effected it is necessary to cut up the large cakes of frozen distillate which are removed from the partitions of the freezing-boxes. This I accomplish by means of cutting-boxes, the construction and operation of which I will now proceed to describe.

Immediately in front of each of the freezing-boxes A is placed a cutting-box, B, the top of the cutting-box being on a level with or a little below the bottom of the freezing-box, and the length of the cutting-box being preferably somewhat greater than the width of the freezing-box, as shown in Fig. 1. The cutting-box B may be made of wood or other material, and of any convenient dimensions in height and width, depending on the capacity of the freezing-box connected therewith. In the bottom of the cutting-box are slides $x$, which may be closed or opened at pleasure, and are placed a sufficient height above the floor of the factory to permit of a wheeled truck or other vessel, N, being run under the cutting-box to receive the frozen distillate after it has been cut into small pieces. A horizontal shaft, $y$, extends lengthwise through the interior of the cutting-box B, which is rotated by a steam-engine or other motor. On this shaft are placed a series of short cast-iron sleeves, $z$, which are flanged at their ends and fastened together by bolts passing through the flanges. Attached to these cast-iron sleeves (or preferably cast in one piece with them) are circular iron disks $b'$, of about two feet diameter, more or less, which serve to carry the knives or cutters $c$. These disks $b'$ may be about two feet apart, and if the sleeves are shorter than that length, each alternate sleeve $z$ may be made without a disk $b$. The cutters $c$ are strips of wrought iron or steel of about two inches in width, and tapering from about three-eighths of an inch at the back to an edge at the front. The edges, however, do not need to be sharp. If the disks are about two feet in diameter, ten such cutters will suffice; but the number of cutters is not very important. The cutters extend lengthwise of the cutting-box to within a short distance of each end, and are screwed or otherwise removably attached to the peripheries of the disks $b'$.

If the freezing-boxes are placed side by side in a straight row, the cutting-boxes will also be so placed, and in this case a single shaft $y$ may extend through the entire length of the series of cutting-boxes. When so arranged, a clutch is keyed to the shaft $y$ between each pair of cutting-boxes, with a sliding crab connected with the end of the outermost sleeve, $z$, of each cutting-box, so that any of the cutters of the series may be started in motion when the freezing-box connected therewith is being emptied of its contents.

The floor of the platform $k$ above the cutting-boxes, and on a level with the bottom of the freezing-boxes, is hinged at $m^2$ at a point above the edge of the cutting-box farthest from the front end of the freezing-box, as shown in Fig. 1, so that that portion of the floor of the platform which is immediately over the top of the cutting-boxes may be conveniently removed to permit of the free discharge of the frozen distillate from the freezing-boxes into the cutting-boxes, the hinged door of the freezing-boxes serving as a guide to the mass of distillate in its descent to the cutting-boxes. By means of these cutting-boxes much time is saved in preparing the frozen distillate for the presses, and the cutting up of the large cakes of frozen distillate is effected so rapidly as to prevent to a great degree the absorption of caloric and the consequent softening of the frozen mass before it is removed to the hydraulic press.

The apparatus before described may be modified in minor details of construction and arrangement; but the process to be conducted therewith is substantially as follows: The saline water or brine (by which the freezing of the paraffine distillate is accomplished) is refrigerated in a pair of tanks, C D—in the former or cold tank by means of the condensed ammonia-gas as it comes from the condensing apparatus, and in the latter or warm tank by means of the waste or partially-spent ammonia-gas which passes from the coils of the cold-tank, as before described. Paraffine distillate, containing as it comes from the stills usually about eighteen per cent. of paraffine, is run at a temperature of about 100° Fahrenheit into one or more of the freezing-boxes, in which the first chilling is to be effected. The freezing-boxes may be filled, if desired, to the top. Brine from the warm-tank D, at a temperature varying from 10° to 45° Fahrenheit, (which, when the process is being carried on continuously, is constantly drawn from the warm-tank D and circulated by the pump Q,) is turned on from the horizontal main L by means of the valve $n'$ into the supply-pipe E, from which it passes through short branch pipes $e$ into the hollow partitions $c$ of the freezing-boxes. The brine, circulating through these partitions for a period of five or six hours, gradually cools the paraffine distillate, bringing the temperature down to a temperature of about 65° Fahrenheit, more or less. The brine from the warm-tank during this part of the operation continuously flows back to the warm-tank, as before described. The distillate is now sufficiently cold to permit of its being subjected to a lower temperature, in order to cool it with greater rapidity down to the required temperature to freeze it into a solid mass. For this purpose the brine from the warm-tank D is shut off from the supply-pipe E by closing the valve $n'$, and the cold brine from the cold-tank C is admitted into the partitions of the freezing-box A by opening the valve $n$, and at the same time the diaphragm $u$ in the trough $h$ is shifted, so as to return the overflowing brine from the freezing-box A through the pipe $s$ to the tank C. The brine coming from the cold-tank will be at a temperature varying from 10° below zero to 20° Fahrenheit. The flow of this cold brine is then continued for about eighteen hours longer, when the distillate will be brought down to a temperature of about 26° to 32° Fahrenheit, being entirely frozen and in a solid mass.

Of course the temperature above stated will vary at different stages of the operation, and both temperatures and time will be modified by the initial temperature of the paraffine distillate when introduced into the freezing-boxes by the degree to which the brine is refrigerated, varying with the number of coils brought into use in the brine-tanks, and by the rapidity with which the brine from the tanks is circulated through the system. When the brine from the warm-tank is turned off from one of the freezing-boxes, in order to introduce the cold brine, as above described, another freezing-box should be ready, filled with hot distillate from the stills, so that the brine from the warm-tank can be immediately turned into it; and so of the cold brine, when the contents of the freezing-box are sufficiently frozen and ready to be removed, another freezing-box containing partially-frozen distillate will be prepared to receive the cold brine, and thereby a continuous operation is carried on with great efficiency and saving of time.

When the paraffine distillate in one of the freezing-boxes is fully frozen, the door of the freezing-box is opened by removal of the bolts and swinging it out on its hinges, the floor of the platform in front of the door being removed or turned over, as shown in Fig. 1, exposing the top of the cutting-box B, the lower edge of the door pressing against the edge of the platform. An iron rod or other instrument is then inserted into the mass of frozen paraffine distillate to start the cakes out of their compartments, which, owing to the inclined floor of the freezing-box and the tapering shape of the compartments, is easily effected, the frozen cakes sliding down and out of the freezing-box by their own gravity as soon as loosened. As they pass out, they are broken into large fragments by a slice-bar, operated by a man standing on the loose flooring on top of the freezing-box, and these fragments of distillate fall down into the hopper of the cutting-box, placed immediately below and in front of the freezing-box, the door of which guides the fragments and secures their passing at once into the cutting-box. These fragments are soon cut up into small pieces by the revolving cutters $c$, and fall into a barrow, N, or other movable receptacle placed under the freezing-box, the slide $x$ being drawn out to allow the contents of the cutting-box to pass out. The frozen distillate is then removed to the hydraulic press, placed in canvas bags, and subjected to pressure, to remove as far as possible the oil with which the paraffine is associated; but the paraffine, after this pressure, still retains a large amount of oil, usually about forty per cent. In order to remove this oil the paraffine is then melted, and is run into one of the freezing-boxes A, where it is subjected to a second freezing process. In the second freezing it is only necessary to chill the paraffine down to about 65° Fahrenheit. For this purpose either the brine from the warm-tank or brine-water at a temperature of about 52° is used, the cold water being preferable. When sufficiently hard, the paraffine is then removed from the freezing-box and passed into a cutting-box, as before described, and then inclosed in canvas bags, and, as before, is subjected to a second pressure of a hydraulic press, to remove the oil which still remains admixed therewith.

What I claim as my invention, and desire to secure by Letters Patent, is—

1. The continuous process of freezing petroleum distillate for the extraction of paraffine, hereinbefore described, consisting of refrigerating the brine or other freezing-liquid by means of condensed ammonia-gas (or other similar refrigerating agent) passed through coils of pipe placed in a cold-brine tank, so that the gas may partially expand therein, passing the partially-spent condensed gas through a second or warm-brine tank, (so as partially to refrigerate the brine therein,) and thence back to the gas-condenser, passing the partially-cooled brine (from the warm-tank) in a continuous stream into a freezing-chamber containing hot paraffine distillate, in which the distillate is gradually and partially cooled, then turning off the stream of partially-refrigerated brine into a second freezing-chamber containing hot distillate, and turning onto the first freezing-chamber containing the partially-frozen distillate a continuous stream of cold brine from the first or cold brine tank until the distillate is completely frozen, and successively treating the hot distillate in each of a series of distillate-freezing chambers, first with brine partially refrigerated by the partially-spent gas, and then with brine more thoroughly refrigerated by means of the condensed gas passing more directly from the gas-condensing pump into the coils of the cold-brine tank, substantially as and for the purposes described.

2. The continuous process of freezing petroleum distillate for the extraction of paraffine therefrom by means of a series of freezing boxes or chambers successively filled at suitable intervals with hot distillate, and treating such distillate in each cooling-box successively, first with brine or other refrigerating-liquid cooled in a separate tank to from 10° Fahrenheit to 45° Fahrenheit, until the distillate is partially frozen, and then with brine or other refrigerating-liquid cooled in another tank to from 10° below zero Fahrenheit to 20° Fahrenheit, until the distillate is completely frozen, the brine from each tank being kept at the proper temperature by circulating constantly through the tank in which it is cooled and the freezing-box, and the brine from each of the tanks, when it has circulated for a sufficient length of time through one freezing-box, being turned off and circulated through another freezing-box of the series charged with paraffine distillate, and so on through other freezing-boxes successively, substantially as described.

3. The process of extracting paraffine from petroleum distillate, which consists in the following successive steps: (a) partially cooling the distillate by placing it in a freezing-box, through which brine or other refrigerating-liquid cooled to from 10° Fahrenheit to 45° Fahrenheit is circulated; (b) completing the freezing of the distillate by the circulation through the freezing-box of colder brine or other refrigerating-liquid cooled to from 10° below zero Fahrenheit to 20° Fahrenheit; (c) discharging the frozen cakes of distillate directly from the freezing-box into a box or trough having a rotating cutter for cutting up the mass into pieces suitable for (d) subjecting the frozen particles of distillate to pressure for the extraction of the petroleum which is mechanically associated with the paraffine, substantially as hereinbefore described.

4. In the process of freezing paraffine distillate, subjecting the hot distillate first to a temperature ranging from 45° to 10° Fahrenheit, and after it has become thereby partially congealed subjecting it to a lower degree of temperature ranging from 20° above to 10° below zero Fahrenheit, substantially as described.

5. In the process of freezing or refrigerating liquids by means of the expansion of condensed volatile gas, passing the partially spent or expanded gas which passes from one refrigerating or freezing tank or vessel into a second refrigerating tank or vessel for the purpose of effecting the partial refrigeration of the liquid contained in the second refrigerating tank or vessel by the more complete expansion of the condensed volatile gas.

6. In the process of refrigerating or freezing liquids by means of the expansion of condensed gas or volatile liquids, passing the condensed gas or other refrigerating substance first downward through a vertical coil of pipe, and then upward through another and connecting vertical coil to its point of exit, for the purpose of securing the more complete expansion of the condensed substance, and thus increasing its efficiency as a refrigerating agent, substantially as described.

In testimony whereof I have hereunto set my hand this 5th day of February, A. D. 1886.

CLARENCE VOSE.

Witnesses:
W. LESLIE SCRYMSER,
H. C. PRATT.